United States Patent
Fouquet

(10) Patent No.: US 7,233,141 B2
(45) Date of Patent: Jun. 19, 2007

(54) METHOD OF PRODUCING A WHEEL SPEED SENSOR AND THE CORRESPONDING SENSOR

(75) Inventor: Thierry Fouquet, Saint Paul sur Save (FR)

(73) Assignee: Siemens VDO Automotive, Toulouse Cedex (FR)

( * ) Notice: Subject to any disclaimer, the term of this patent is extended or adjusted under 35 U.S.C. 154(b) by 468 days.

(21) Appl. No.: 10/506,041

(22) PCT Filed: Feb. 28, 2003

(86) PCT No.: PCT/EP03/02067

§ 371 (c)(1),
(2), (4) Date: Aug. 30, 2004

(87) PCT Pub. No.: WO03/081260

PCT Pub. Date: Oct. 2, 2003

(65) Prior Publication Data

US 2005/0115317 A1  Jun. 2, 2005

(30) Foreign Application Priority Data

Mar. 27, 2002  (FR) .................................. 02 03820

(51) Int. Cl.
*G01B 7/30* (2006.01)
(52) U.S. Cl. ................................. 324/207.25
(58) Field of Classification Search ............ 324/207.25
See application file for complete search history.

(56) References Cited

U.S. PATENT DOCUMENTS

| 6,053,049 A | 4/2000 | Hoyle et al. |
| 6,155,114 A | 12/2000 | Karino et al. |
| 6,291,990 B1 * | 9/2001 | Nakane et al. ......... 324/207.25 |
| 6,326,779 B1 * | 12/2001 | Shinjo et al. .......... 324/207.21 |
| 6,356,073 B1 * | 3/2002 | Hamaoka et al. ........ 324/207.2 |

FOREIGN PATENT DOCUMENTS

FR  2 683 315  5/1993

* cited by examiner

*Primary Examiner*—Bot LeDynh
(74) *Attorney, Agent, or Firm*—Young & Thompson

(57) ABSTRACT

Manufacture of a speed sensor, including a cable (15) containing electrical wires for connection between the sensor and a data processing unit, pins joined to the wires and to connection blades of a member for detecting the rotation speed of the wheel of the vehicle, a first molded plastic casing portion (3), having a shaft (13) molded around one end of the wires of the cable, and a cavity in which the pins and the detection member are placed, the pins being mutually separated and the wires being mutually separated at the point of their stripped end, and the detection member being held in place in the cavity of the first casing portion by retaining lugs made of one piece with this first casing portion, and a second casing portion (5) including a part that isolates the pins and the detection member from the outside.

10 Claims, 4 Drawing Sheets

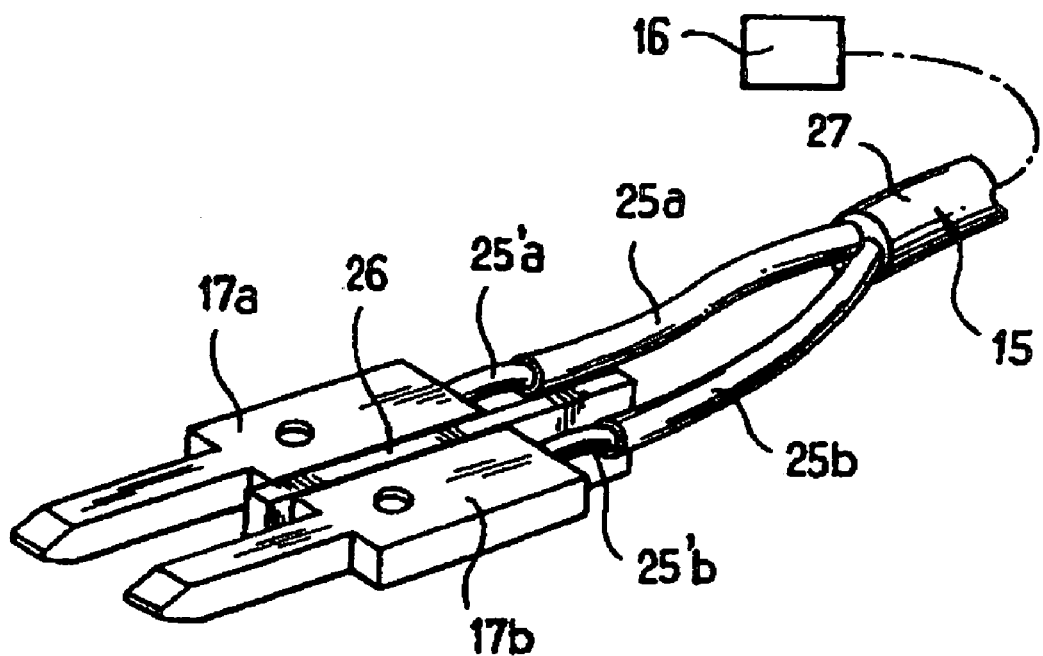
FIG_4
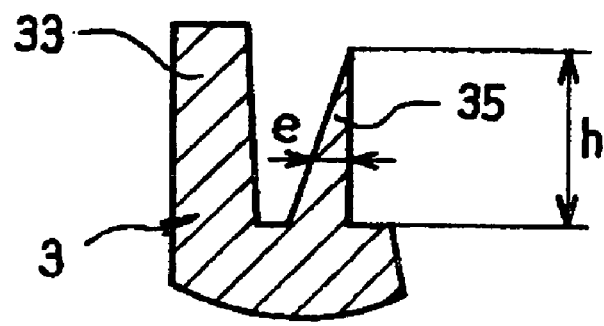
FIG_5

METHOD OF PRODUCING A WHEEL SPEED SENSOR AND THE CORRESPONDING SENSOR

CROSS REFERENCE TO RELATED APPLICATION

This is the 35 U.S.C. 371 national stage of international application PCT/EP03/02067 filed on 28 Feb. 2003, which designated the United States of America.

FIELD OF THE INVENTION

The invention relates to the manufacture of a speed sensor for the wheels (or one wheel) of a vehicle, in particular a motor vehicle.

BACKGROUND OF THE INVENTION

Typically, it is important in certain safety systems (in particular for antiskid or antilocking when braking) to know the rotation speed of the wheels of the vehicle.

To do this, it is known to use a sensor provided with a detection member that detects the rotation speed of the wheels of this vehicle. The sensor is connected to a means for processing the data acquired, so as to use this data within the safety system.

In this context, the invention relates more particularly to a process for manufacturing such a sensor and to the sensor itself.

A typical sensor of the prior art comprises a detection member as mentioned above (usually comprising an electronic circuit and electrical connection blades) and a protective casing. In the casing, the connection blades are connected to a stripped end of the electrical wires of a cable via pins. The casing is designed to be fastened onto the vehicle. The detection member may be of electromagnetic type and is then designed to work typically in conjunction with facing striations or facing teeth formed on the wheel of the vehicle when the sensor is combined with a ferromagnetic target or a succession of North and South poles in the case of a magnetic target.

SUMMARY OF THE INVENTION

One problem that the invention aims to solve is to simplify the conditions under which such sensors are manufactured, so as to reduce scrap and, if possible, to shorten the cycle times, and also to reduce the overall cost of the sensor.

To manufacture the sensor, one solution proposed in the invention consists of the following:
- a cable is placed in a mold, said cable comprising electrical wires provided with pins for connection between the sensor and a means of processing the data acquired by this sensor, and a separator is interposed locally between said wires and/or their pins, avoiding any electrical contact between these wires and these pins at least during the subsequent molding step;
- a first casing portion is molded around one end of the cable and around the pins joined to the wires,
  leaving open at least one cavity in which at least one portion of said pins is located, these being intended to ensure electrical contact between the wires and connection blades with which a member for detecting the rotation speed of the wheels of the vehicle is provided,
  reserving a region in the cavity for housing the detection member and its blades, and
  providing, on at least one portion of the periphery of this cavity, a rim lined on the inside, at least locally, by a wall, in order to define a fusible region;
- the detection member of the sensor is placed at that point in the region that is reserved for it in the cavity, its blades then preferably being located in immediate proximity to the pins;
- the pins and the blades of the detection member are welded or soldered to each other in the cavity, this detection member being held in place with respect to the casing by retention lugs that are molded with said first casing portion; and
- the cavity is closed, facing the pins and the detection member, by means of a second casing portion fusion-bonded at the point of the fusible region.

In this way, the risks of a short circuit during manufacture of the casing and during imprisonment of the electrical connectors (wires, pins, etc.) are limited, the sealing conditions are favored (especially by molding the first casing portion around one end of the cable), and there is overall a reduction in the number of operations and/or the manufacturing cycle time.

One important feature also relates to holding the detection member in place with respect to the casing.

According to one feature of the invention, this retention is advantageously obtained by means of lugs which extend toward the interior of the cavity and are molded during the step of molding said first casing portion, the steps of placing the detection member in the cavity and of soldering it therein including a step of engaging said detection member under and/or between the lugs in order to hold it in place.

This therefore avoids a rework operation after the first casing portion has been molded.

Another feature of the invention favors the soldering of the connection blades of the detection member to the pins.

For this purpose, it is recommended that the step of molding the first casing portion around the wires and the pins comprise the reservation of an opening that communicates with the cavity, in a localized region of the pins, in order to allow electrical soldering between the blades of the detection member and the pins, by means of electrodes placed on either side of the pins and the blades.

This increases the overall reliability of the sensor.

Another feature of the invention the sealing conditions in the cavity of the casing to be further improved.

To do this, it is recommended that the step of closing this first casing portion comprise the localized overmolding of the first casing portion with the second, which closes the cavity forming a liquid-tight and dust-tight seal, at the place of a single lip which defines said fusible region that is made to fuse during the overmolding and which extends around the periphery of the cavity, over a height and a thickness that are less than those of the rim that surrounds it.

As already indicated above, the invention also relates to the speed sensor itself.

One important feature relating to this is that its first plastic casing portion comprises a shaft molded around one end of the wires of the cable, in order to intimately surround them so as to form a liquid-tight and dust-tight seal, and a cavity in which the pins and the detection member are placed, the pins being mutually separated and the wires being mutually separated at the point of their stripped end, and the detection member being held in place in said cavity of the first casing portion by retaining lugs made as one piece with this first casing portion.

With regard to sealing the reception cavity, especially the detection member, it is also recommended that said connection lip, that can melt more rapidly than the rim, and is therefore fusion-bondable with the second casing portion, be formed by a single wall over the entire perimeter of the cavity.

Yet another feature of the invention has the purpose of limiting the risks of the cable (which is cylindrical) rotating during the operation of manufacturing the sensor, which rotation would result in an incorrect assembly.

One solution proposed is that the shaft of the first casing portion has, on the outside, at least one parallelepipedal (typically rectangular or square) flange.

BRIEF DESCRIPTION OF THE DRAWINGS

An even more detailed description of the invention will now be provided with reference to the appended drawings, in which:

FIG. 4 shows the pins, the wires and the cable for transmitting the data acquired by the detection member, before they are embedded by the plastic of the first casing portion, which is molded around them; and FIG. 5 is a sectional view on the line V—V of FIG. 2.

DETAILED DESCRIPTION OF THE INVENTION

Figure 1:
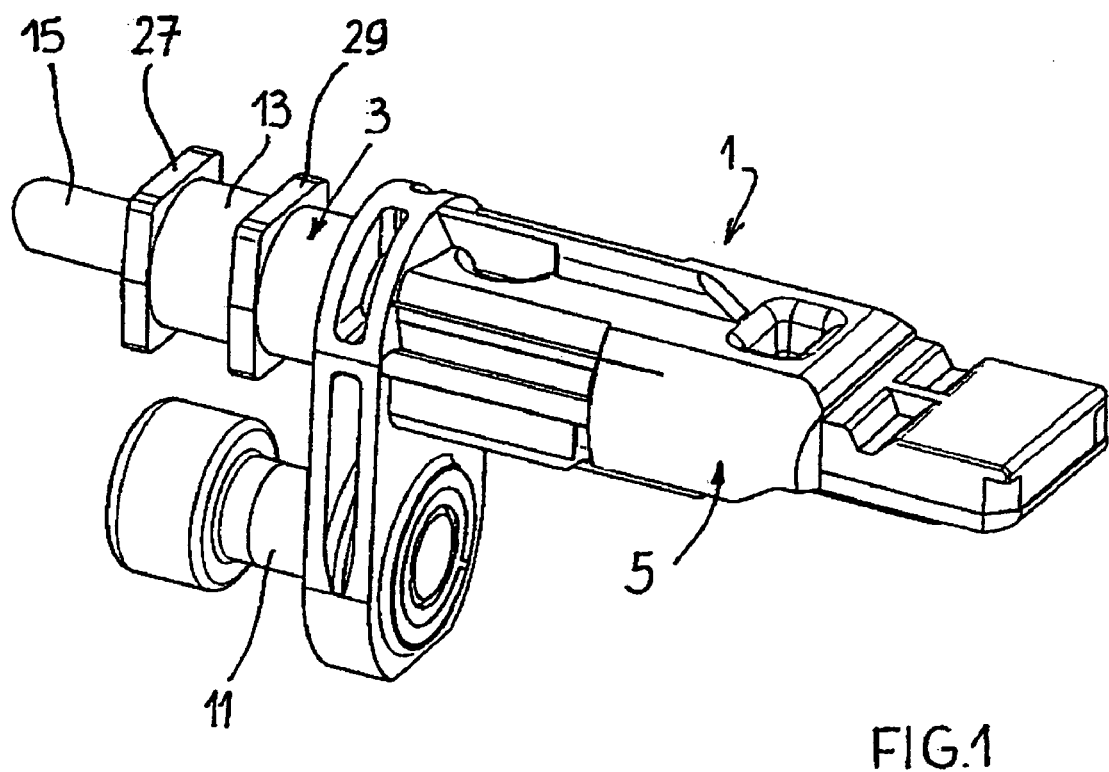
FIG. 1 is a ¾ top perspective view of the sensor ready to be fastened onto the vehicle that is intended to be equipped therewith.

FIG. 1 shows an illustrative example of a sensor 1 according to the invention, in its fully assembled state.

Figure 2:
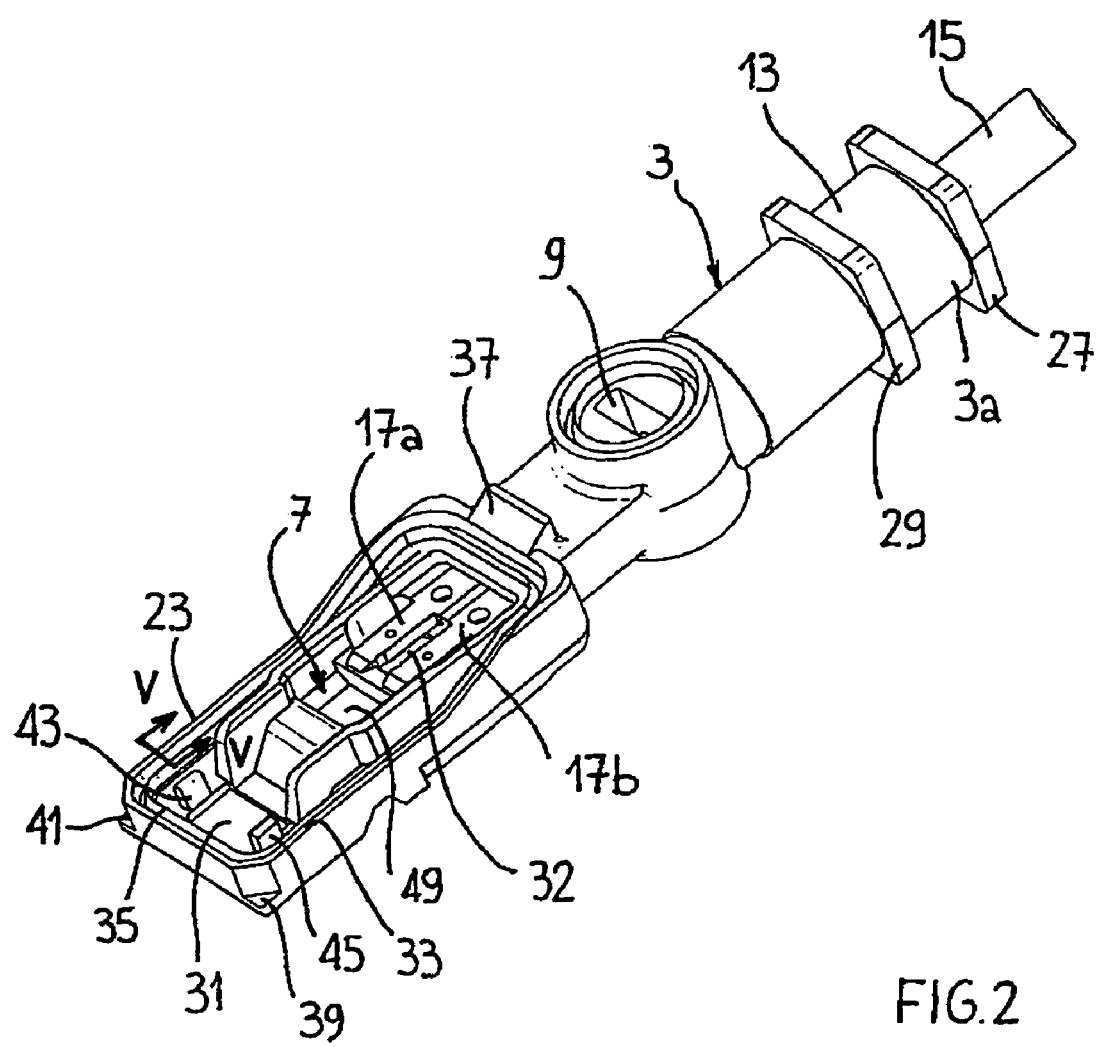
FIG. 2 is also a perspective view "from above" of a first step in the manufacture of the sensor (the detection member and the second casing portion not being present)
Figure 3:
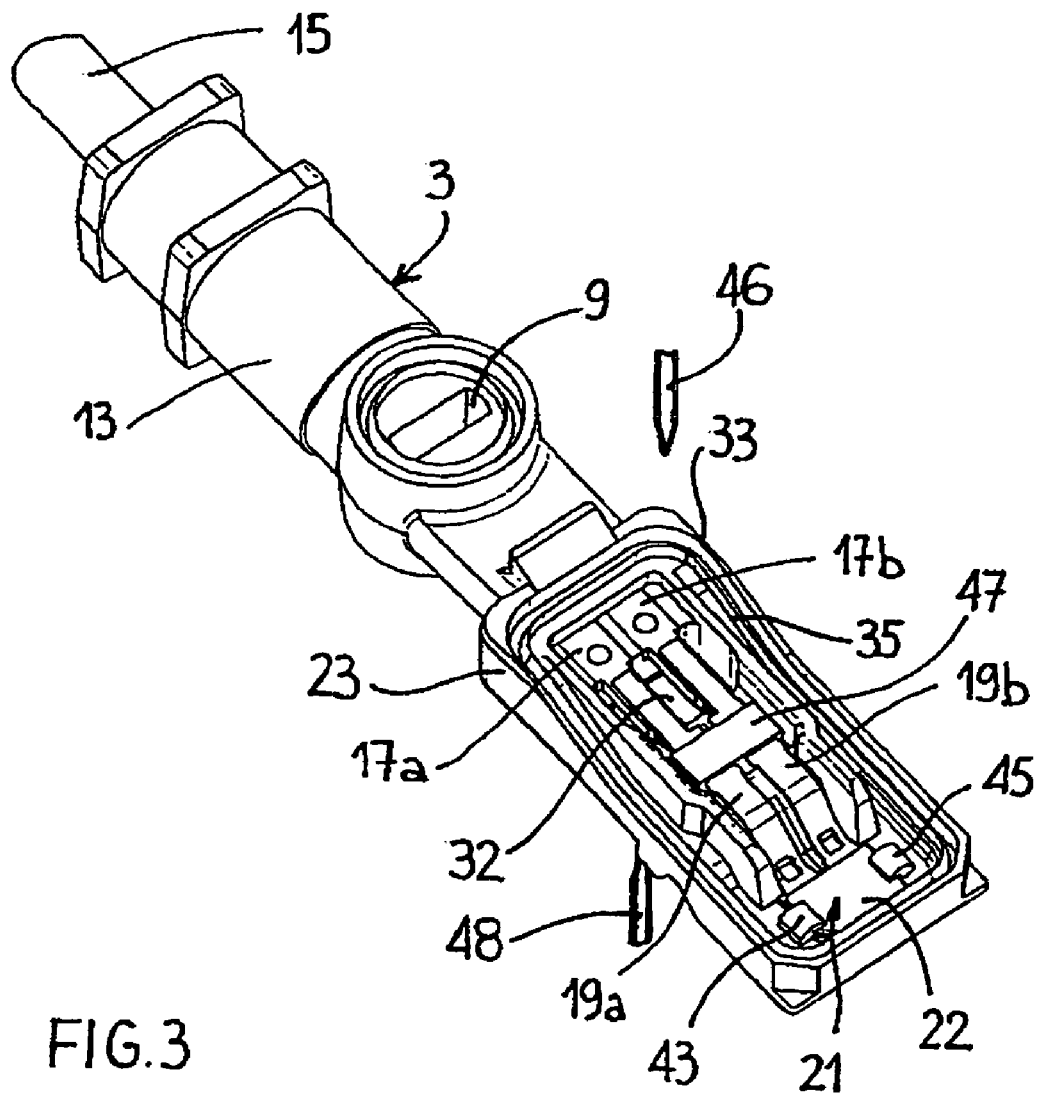
FIG. 3 also shows, in perspective "from above", the sensor of FIG. 2 with the detection member installed.

The sensor 1 comprises a first casing portion 3, which may be more clearly seen in FIGS. 2 and 3, and a second casing portion 5.

The second casing portion is a plastic sealing part overmolded onto the first casing portion 3, especially in order to seal off a cavity 7 of the portion 3, and also the well 9 of the same portion 3.

The sealing part 5 is furthermore equipped with a screw 11 for fastening to a wall of the vehicle.

The part 5 ensures that the parts contained inside the cavity 7 are sealed with respect to liquids and dust.

In its molded state shown in FIG. 3, the first casing portion 3 takes the form of a one-piece part made of a meltable plastic and has a shaft 13 that may also be seen in FIG. 1, from which emerges at the rear (again in a liquid-tight and dust-tight manner) a cable 15 whose electrical wires are connected, on one side, to a data processing means 16, such as an electronic calculator (FIG. 4), and, on the other side, to pins 17a, 17b that are electrically connected to the blades 19a, 19b of a detection member 21, known per se.

The detection member 21 comprises an electronic board 22 designed to detect, particularly by electromagnetism, the rotation speed of a wheel of a vehicle, for example in conjunction with striations formed facing it on this wheel.

As shown in FIGS. 2 and 3, the shaft 13 extends from the rear end 3a of the first casing portion 3 as far as a kind of box 23, which is open here and defines, on the inside, the cavity 7 in which at least one portion of the pins 17a, 17b and the detection member 21 are housed.

Provided at one point on the shaft 13 is the transverse well 9 through which the electrical wires (in this case two wires) of the cable 15 pass. At this point, the wires are not stripped.

The production of the part illustrated in FIG. 3 is carried out as follows, with a first step consisting as illustrated in FIG. 2.

As illustrated in FIG. 4, the terminal end of the cable 15, and in particular the two wires 25a, 25b that emerge from its jacket 27, and the two pins 17a, 17b, to which a stripped end 25'a, 25'b of the electrical wires is already connected, are placed in a mold.

To avoid short circuits between the wires 25a, 25b, and between the pins 17a, 17b, it is recommended to provide, in the mold, a separating wall (not shown). Optionally, this wall can be moved, that is to say it is retractable. Another already known solution could consist in the addition of a plastic separator attached or molded between the wires and/or between the pins, as shown schematically at 26 in FIG. 4.

Once the assembly shown in FIG. 4 has been correctly positioned and held in place in the molding cavity, the plastic needed for molding the first casing portion 3 shown in FIG. 2 is supplied.

Typically, the molding will be carried out by injecting pressurized plastic into the molding cavity.

It may be noted that this part has, near the rear end 3a, one or more parallelepipedal flanges, such as 27 and 29, which can be used as an antirotation and/or stop device for subsequently placing, in the correct manner, the sensor in the assembly line, in particular when fastening it to the vehicle.

The transverse well 9 that passes right through the shaft 13 allows the operator to see the passage of the wires 25a, 25b and to check that they are correctly positioned both with respect to each other and with respect to the pins, which are at least partly visible inside the cavity 7, and are parallel to each other.

In this case, the two-stage aspect of the cavity may be noted: the pins are located at a different height from that of the front region 31 reserved, opposite the pins, for housing the electronic board 22, the blades 19a, 19b of which have here a curved shape in order to "take up the difference" in level of the pins to which they have to be electrically connected (see FIG. 3).

It should also be noted, in FIGS. 2 and 3, that there is, across the bottom (which is moreover solid) of the cavity 7, facing the pins, an orifice 32 passing through this bottom, the utility of which will be explained below.

It should also be noted that the entire perimeter of the box 23 has an upright wall 33 advantageously lined on the inside by a thinner fusible lip 35.

Preferably, this lip is formed by a single wall that is continuous over most (and preferably all) of the perimeter of the cavity, a short distance from the outer rim 33, as may be seen in the cross section in FIG. 5.

This lip is advantageously made of the same material as the rim and, more generally, as the rest of the first casing portion 3.

In FIG. 5, the height h and the thickness e of the lip 35 are less than those of the outer rim 33 which thus protects the lip, the latter tapering down toward its free end in order to favor rapid melting. In this case, it is also a beveled lip.

It should also be noted that the regions where the first casing portion 3 is manipulated are preferably remote from the lip such as for example at the place of the lugs 37, 39 and 41 that may be used as stops for guaranteeing the precise positioning of said casing portion 3 in the overmolding mold and/or of the sensor 1 in the assembly line when it has to be fastened to the vehicle.

In FIG. 2, the detection member, with its electronic board 22 and its connection blades 19a, 19b, has not yet been placed in the cavity 7.

However, it should be noted that, at the region 31, lugs (in this case two in number, namely 43 and 45) may already have been molded during molding of the first casing portion 3, under (or between) which lugs the board 22 may be slipped and held in place pressed into the casing.

Thus, once the first casing portion 3 has been molded as illustrated in FIG. 2, the board 22, with its connection blades 19a, 19b, may be slid into its housing, the free end of the connection blades facing (in this case above) the thinner end of the pins 17a, 17b.

It should be noted that the overlap part between the pins and the connection blades nevertheless lies facing the orifice 32 in the box 23.

This particular feature makes it possible to place, above the cavity 7, a first soldering electrode 46 located facing this overlap part between the pins and the connection blades, the second welding electrode 48 being located in the orifice 32, so that an electrical discharge between these electrodes allows each pin and each blade to be electrically connected together.

To hold the blades in place, a plastic insert 47 may be provided, which is held against the casing portion 3 in a reserved housing 49 (see FIG. 2), after molding.

Rather than fitting the detector board 22 under the molded lugs 43, 45 and retaining them there, it will be possible to choose to place the board in its housing 31 and then to carry out a subsequent operation in order to fasten it to the casing, in particular by snap-riveting.

Once the part is in its state as shown in FIG. 3, there remains only to close the cavity 7 and the well 9, by means of the sealing part 5.

To do this, it is recommended to place the whole assembly illustrated in FIG. 3 in an overmolding mold in order to inject the part 5.

During this operation, the cavity 7 will in particular be able to be sealed off by means of the fusible lip 35, the melting of which together with a corresponding portion (not shown) of the material of the part 5 will entirely close off the cavity, most particularly if this lip 35 extends continuously around the entire perimeter of the cavity.

The part 5 embeds the well 9, but leaves the positioning flanges 27, 29 exposed.

The invention claimed is:

1. A process for manufacturing a wheel speed sensor for a vehicle, which comprises:
   placing a cable (15) in a mold, said cable comprising electrical wires (25a, 25b) provided with pins (17a, 17b) for connection between the sensor and a means of processing data acquired by said sensor, and interposing a separator (26) locally between said wires and/or their pins, avoiding any electrical contact between these wires and these pins at least during a subsequent molding step;
   molding a first casing portion (3) around one end of the cable and around the pins joined to the wires,
      leaving open at least one cavity (7) in which at least one portion of said pins is located, these being intended to ensure electrical contact between the wires and connection blades (19a, 19b) with which a detection member for detecting the rotation speed of the wheels of the vehicle is provided,
      reserving a region (31) in the cavity for housing the detection member and its blades (21; 22, 19a, 19b), and
      providing, on at least one portion of the periphery of this cavity, a rim (33) lined on the inside, at least locally, by a wall (35), in order to define a fusible region;
   placing the detection member (22) of the sensor at that point in the region (31) that is reserved for it in the cavity;
   welding or soldering the pins and the blades (19a, 19b) of the detection member to each other in the cavity, said detection member being held in place with respect to the casing by retention lugs (43, 45) that are molded with said first casing portion; and
   closing the cavity, facing the pins and the detection member, with a second casing portion (5) fusion-bonded at the point of the fusible region (35).

2. The process as claimed in claim 1, characterized in that the detection member is held in place with respect to the casing by means of lugs (43, 45) which extend toward the interior of the cavity (7) and are molded during the step of molding said first casing portion (3), the steps of placing the detection member (21) in the cavity and of soldering it therein including a step of engaging said detection member under and/or between the lugs in order to hold it in place.

3. The process as claimed in claim 1, characterized in that the step of molding said first casing portion (3) around the wires and the pins comprises the reservation of an opening (32) that communicates with the cavity (7), in a localized region of said pins, in order to allow electrical soldering between the blades of the detection member and the pins, by means of electrodes (46, 48) placed on either side of the pins and the blades.

4. The process as claimed in claim 1, characterized in that the step of closing said first casing portion (3) comprises the localized overmolding of the first casing portion with the second, which closes said cavity (7) forming a liquid-tight and dust-tight seal, at the place of a single lip (35) which defines said fusible region (5) that is made to fuse during the overmolding and which extends around the periphery of the cavity, over a height and a thickness that are less than those of a rim (33) that surrounds it on the outside.

5. A wheel speed sensor for a vehicle, comprising:
   a cable (15) containing electrical wires (25a, 25b) for connection between the sensor and a means (16) of processing data acquired by this sensor;
   pins (17a, 17b) joined to the wires and to connection blades (19a, 19b) of a detection member (21) for detecting the rotation speed of the wheel of the vehicle;
   a first molded plastic casing portion (3), comprising a shaft (13) molded around one end of the wires of the cable, in order to intimately surround them so as to form a liquid-tight and dust-tight seal, and a cavity (7) in which the pins and the detection member are placed, the pins being mutually separated and the wires being mutually separated at the point of their stripped end, and the detection member being held in place in said cavity of the first casing portion by retaining lugs (43, 45) made as one piece with this first casing portion; and
   a second casing portion (5) comprising a part that isolates the pins and the detection member from the outside, so as to form a liquid-tight and dust-tight seal.

6. The sensor as claimed in claim 5, characterized in that the cavity (7) of the first casing part is bordered by a rim (33) lined internally, at least locally, by a wall (35) that can melt more rapidly than the rim, so as to constitute a connection lip that is fusion-bondable with the second casing portion (5).

7. The sensor as claimed in claim 6, characterized in that the lip (35) is thinner and lower than the rim (33) that surrounds it.

8. The sensor as claimed in claim 6, characterized in that the lip (35) is formed by a single wall extending over the entire perimeter of the cavity.

9. The sensor as claimed in claim 6, characterized in that the shaft (13) of the first casing portion has, in the absence of the second casing portion, an open well (9) allowing the electrical wires of the cable crossing it to be seen.

10. The sensor as claimed in claim 5, characterized in that the shaft (13) of the first casing portion has a parallelepipedal flange (27, 29) for preventing the cable from rotating.

* * * * *